UNITED STATES PATENT OFFICE.

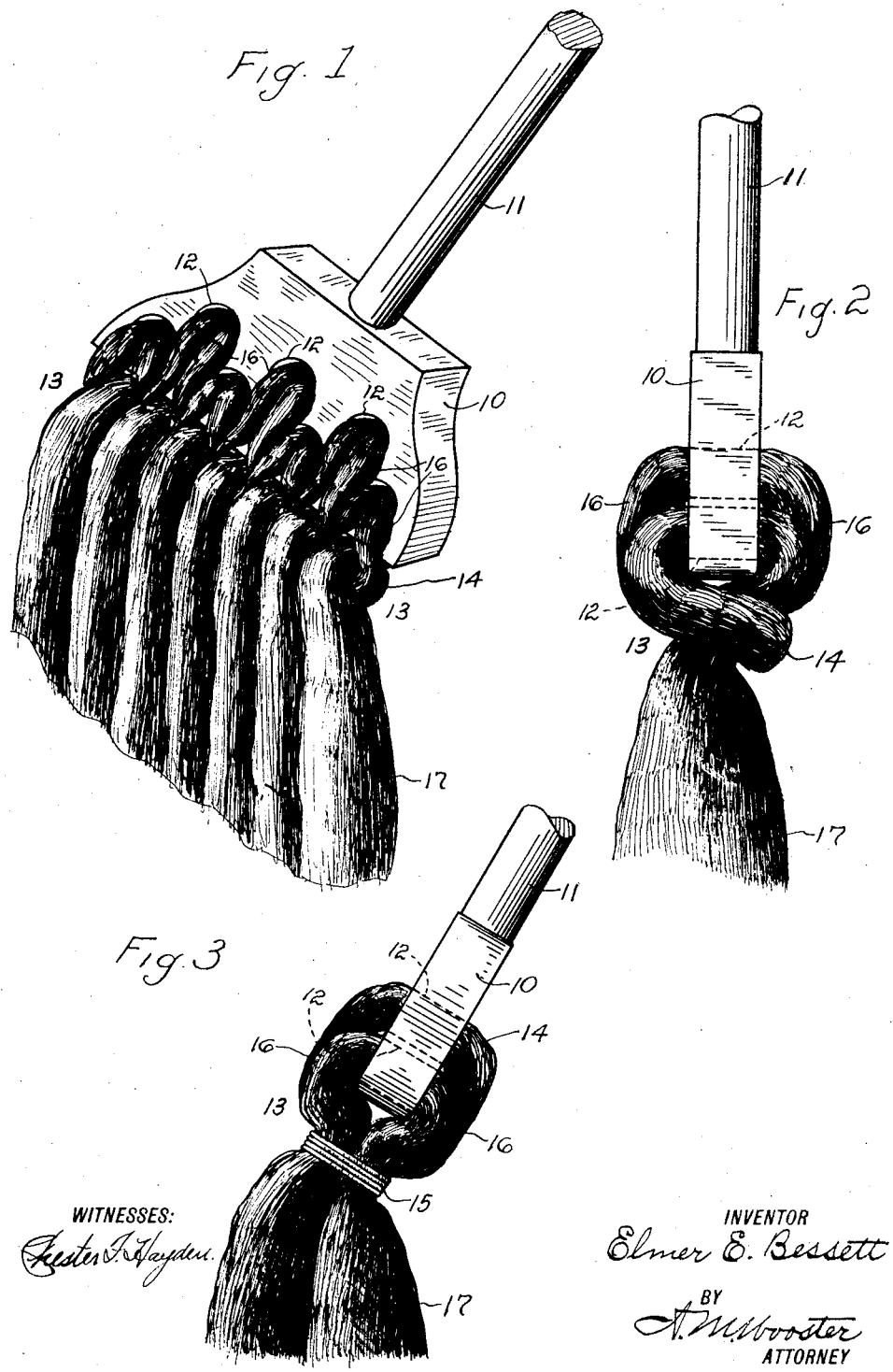

ELMER E. BESSETT, OF WATERLOO, QUEBEC, CANADA.

MOP.

1,344,112.                    Specification of Letters Patent.    Patented June 22, 1920.

Application filed November 7, 1919. Serial No. 336,364.

*To all whom it may concern:*

Be it known that I, ELMER E. BESSETT, a citizen of the United States, residing at Waterloo, Province of Quebec, Canada, have invented an Improvement in Mops, of which the following is a specification.

This invention has for its object to provide an inexpensive, practical, exceedingly durable and easily renewable mop for general use, as for washing floors, windows, etc., and the invention consists in a head having transverse holes and a body comprising clusters or bunches of strands of wicking, strips of cloth or other suitable material which are passed through the holes and secured in place either by knotting the bunches or by tying them with cord.

In the accompanying drawing forming a part of this specification, Figure 1 is a perspective view of a mop showing the bunches of strands as passed through the holes in the head and secured in place by knots of the bale sling type;

Fig. 2 an end elevation corresponding therewith, and

Fig. 3 is a similar view showing the bunches of strands secured by cord.

10 denotes the head and 11 the handle which is suitably secured thereto. The head may be made of any suitable material but is preferably of wood and is made with flat sides. The head is provided with a plurality of transverse holes, indicated by 12. The clusters or bunches of strands, indicated by 13, are passed through these holes and are suitably secured. The clusters may consist of strands of wicking or strips of cloth or of any suitable absorbent material.

In Figs. 1 and 2 I have shown a form of the invention in which the clusters consist of strands doubled upon themselves at their mid length, the doubled bunch of strands being as large as can be passed through the holes conveniently. The loops of strands, indicated by 14, are pulled through the holes far enough to permit the free ends of each doubled bunch of strands to be passed through the loop after which the free ends are pulled and the loop drawn up tightly against the head, as clearly shown, the loops being preferably drawn up against the base of the head as shown in Fig. 2. No other fastening of the clusters is required.

In Fig. 3 I have illustrated a variant form in which the bunches of strands of wicking or strips of cloth are not doubled, but bunches are used as large as can be conveniently passed through the holes. The bunches are pulled through the holes to their mid length leaving the free ends of the bunches hanging down loosely from the head. The clusters or bunches are then secured by winding a cord 15 tightly about them below the head, the ends of the cord being knotted or otherwise tightly secured.

It will be noted that either form of securing the clusters provides a soft pad, indicated by 16, on opposite sides of the base of the head leaving the free ends of the clusters depending loosely. I thus provide a mop head thoroughly padded so that it will not scratch the finest floors and will not scratch a window when used as a window cleaner, and below the head I provide a mass of loose soft material, indicated by 17, which will absorb water freely and can be conveniently cleansed by agitation in clean soapy water. When the pads and absorbent masses become worn by long continued use they may be readily removed and new clusters consisting of bunches of strands of wicking or strips of cloth may be inserted in the head and the mop made as good as new.

The number of clusters used is of course immaterial so far as the principle of the invention is concerned. The holes are preferably made in two or more rows so as not to injuriously weaken the head, while enabling the holes to be made large enough to receive sufficiently large bunches of strands of wicking or other suitable material, either with or without doubling, to form pads on both sides of the head and absorbent masses large enough for the purpose required. In the present instance I have shown a head provided with two rows of holes in alternating order, the upper row consisting of three holes and the lower row of four holes, although these details of construction may be varied to suit the purposes for which the mop or cleaner is intended without departing from the principle of the invention.

It will be seen that I have provided a construction which satisfied the objects enumerated above, and while I have shown the invention in certain physical embodiments it is to be understood that modifications of the structure shown may be made by those skilled in the art without departing from my invention, as expressed in the following claims:

A mop comprising a head having transverse holes and clusters consisting of bunches of absorbent strands doubled at their midlengths which are drawn through the holes forming loops, the free ends of the bunches being passed through the loops, the free ends being secured by drawing the loops against the head, thus forming protecting pads on opposite sides of the head and a protecting pad below the lower edge of the head.

In testimony whereof I affix my signature.

ELMER E. BESSETT.